G. W. R. ZIMMERMAN.
INCUBATOR.
APPLICATION FILED NOV. 12, 1909.

960,476.

Patented June 7, 1910.
2 SHEETS—SHEET 1.

Inventor
George W. R. Zimmerman

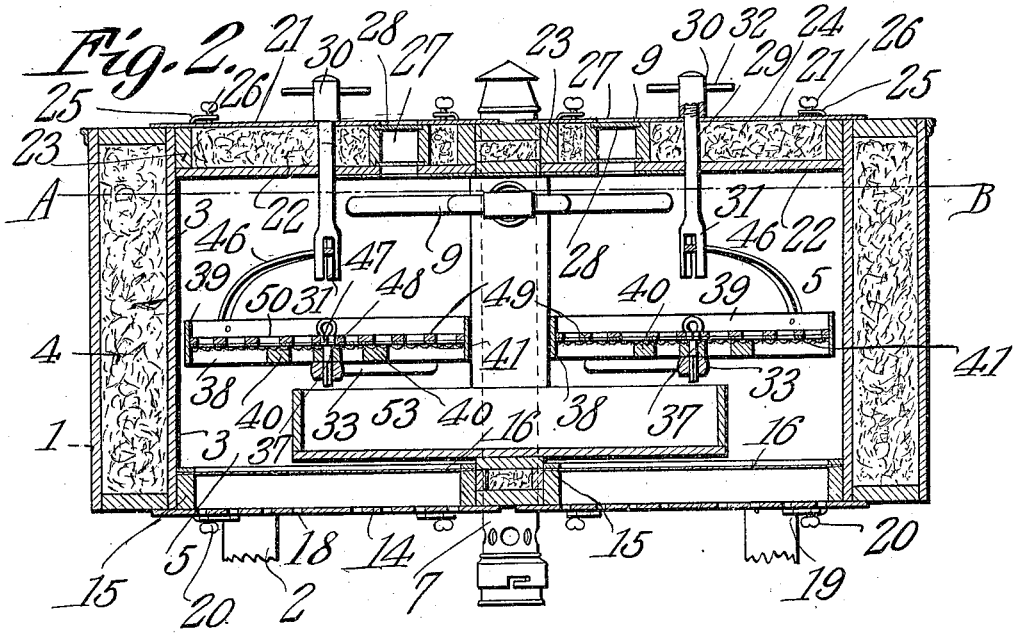

UNITED STATES PATENT OFFICE.

GEORGE W. R. ZIMMERMAN, OF LIME KILN, MARYLAND.

INCUBATOR.

960,476. Specification of Letters Patent. Patented June 7, 1910.

Application filed November 12, 1909. Serial No. 527,656.

*To all whom it may concern:*

Be it known that I, GEORGE W. R. ZIMMERMAN, a citizen of the United States, residing at Lime Kiln, in the county of Frederick and State of Maryland, have invented a new and useful Incubator, of which the following is a specification.

This invention relates to incubators and one of its objects is to provide a compact device of this character having egg holding trays therein which can be readily manipulated for the purpose of shifting the eggs and for testing them.

Another object is to provide improved means for ventilating the interior of the incubator, said means including removable bottom sections of novel construction.

With these and other objects in view the invention consists of certain novel details of construction and combinations of parts hereinafter more fully described and pointed out in the claims.

Figure 1:
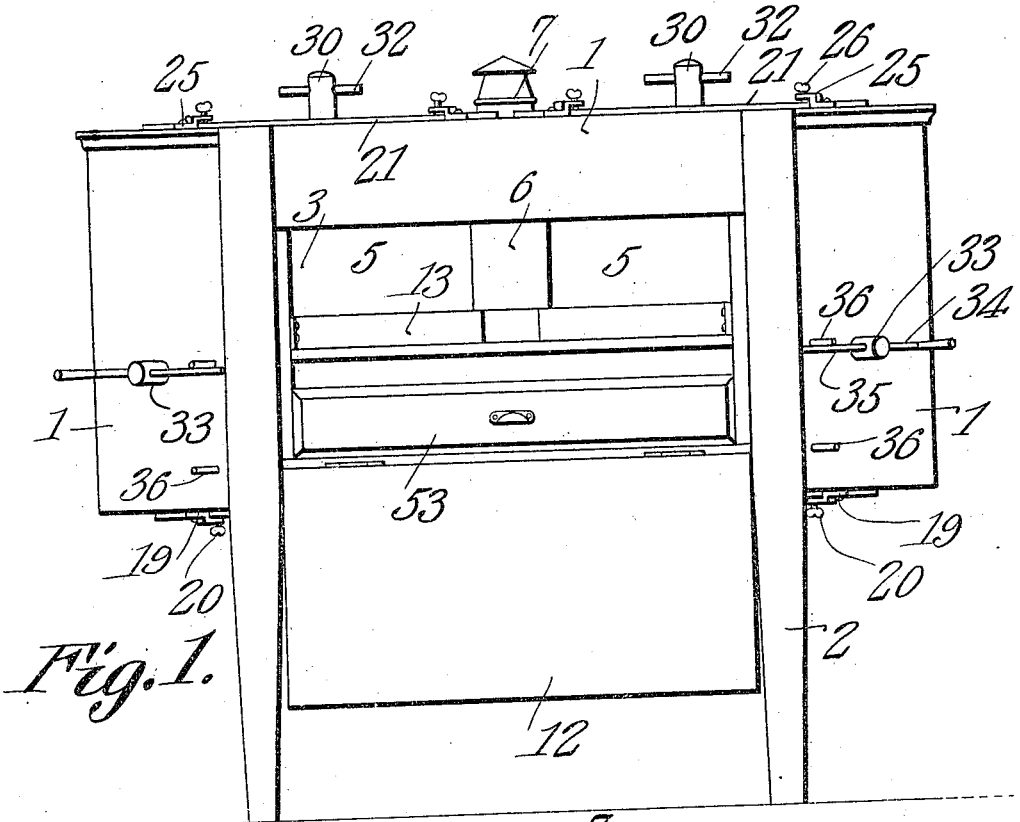
Figure 3:
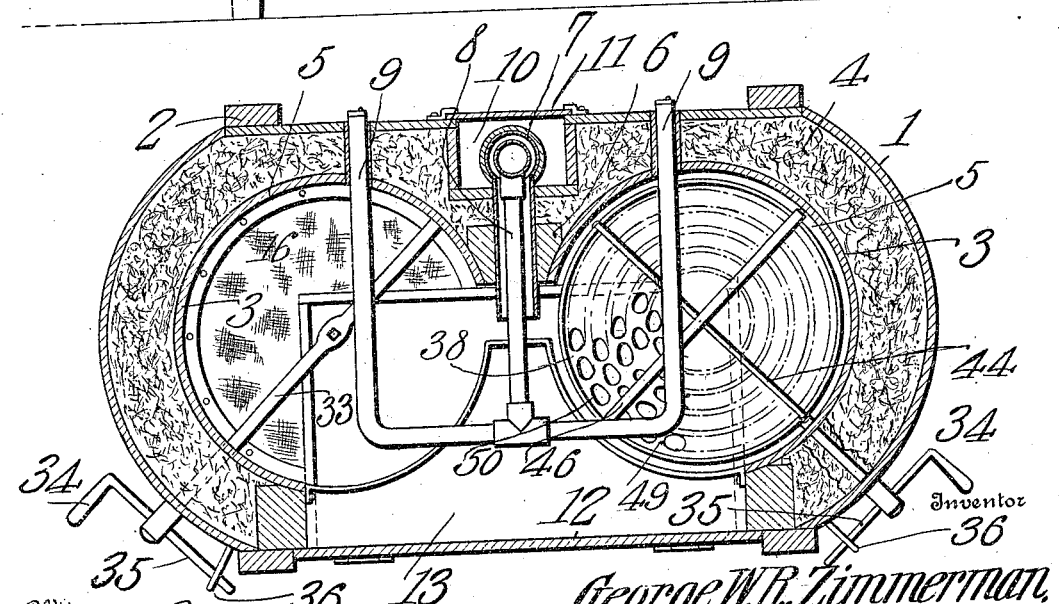

In the accompanying drawings the preferred form of the invention has been shown. In said drawings, Figure 1 is a front elevation of an incubator constructed in accordance with the present invention, the front closure thereof being open. Fig. 2 is a vertical longitudinal section through the incubator. Fig. 3 is a section on line A—B, Fig. 2, one of the trays being removed and, for the sake of clearness, only a few of the egg receiving openings in the disk on the other tray being shown. Fig. 4 is a plan view of one of the egg holding trays or baskets, a portion of a disk being shown therein. Fig. 5 is a bottom plan view of one of the removable bottom sections. Fig. 6 is an enlarged section on the line C—D, Fig. 4. Fig. 7 is a detail view of a modified form of disk for use in connection within the egg tray.

Referring to the figures by characters of reference, 1 designates the outer wall of the body of the incubator, said wall being supported upon suitable legs 2 and there being curved inner walls 3, within the end and back portions of the body and which are spaced from the exterior walls by means of suitable packing material such as shown at 4. The interior of the body is thus provided with two substantially circular compartments 5 separated at the back by a forwardly extending partition 6 within which is arranged a heater 7 of any preferred construction, this heater being provided with a main flue 8 for conducting products of combustion into the middle portion of the body where they are distributed to oppositely extending heating tubes 9 which extend partly through the two compartments 5 and then discharge through the back wall of the casing.

An opening 10 is preferably formed in the back wall close to the heater 7 and is normally closed by means of a slide 11. Obviously by shifting the slide, access can be conveniently had to the heater and to the space between the back portions of the inner and outer walls 3 and 1. The front of the casing is preferably closed by means of a hinged door 12 designed to swing downwardly and a shelf 13 is preferably arranged within the front portion of the body and so shaped as to project between the two compartments 5, the side edges of the shelf being curved to conform to the contour of the walls of said compartment. This arrangement of the shelf has been clearly indicated in Fig. 3. It is to be understood that this shelf is removably mounted in any preferred manner.

Each of the compartments 5 is provided with a circular removable bottom such as is shown, for example, in Fig. 5. Each one of these bottoms is preferably formed of semi-circular sections 14 hingedly connected and having a ring 15 upstanding therefrom, said ring being made up of sections one of which is located on each of the sections 14. A fabric covering 16 is stretched over the ring 15. Openings 18 are formed within the sections 14 and are designed to direct fresh air into the space formed between said sections and the fabric 16. Each of the rings 15 is designed to fit snugly within the bottom portion of one of the compartments 5 and the sections 14 project beyond the ring and are designed to bear upwardly against the bottom of the casing or body. Each of these projecting portions is detachably engaged by a pivoted locking strip 19 which is mounted upon the bottom of the body and is designed to extend under the sectional bottom of the compartment 5, each of the strips being provided with a thumb screw 20 or the like whereby the sections 14 can be forced firmly against the bottom of the body.

The upper end of each of the compartments 5 is provided with a closure consisting of upper and lower disks 21 and 22 respectively, said disks being spaced apart by a ring 23 and there being a filling material 24 of bran, straw, or other desirable substance for retaining heat within the compartment. Retaining strips 25 are pivotally mounted upon the top of the body of the incubator and are designed to move into position over the disks 21, each of these strips carrying a thumb screw 26 which can be moved downward onto the disk 21 and firmly clamped upon the body of the incubator. A sight opening 27 is formed within each of the top closures and each of these openings may be provided with an upper and a lower glass 28, spaced apart so as to form an air space therebetween. By means of these sight openings the contents of the compartment can be inspected at any time without the necessity of opening the incubator. A central opening 29 is formed within each of the top closures of the compartments 5 and in each of the central openings is mounted a revoluble key 30 having a forked lower end as shown at 31, there being a suitable handle 32 at the upper end of the key by means of which said key can be conveniently rotated.

A rock bar 33 extends diametrically through each of the compartments 5 and through the wall of the body of the incubator at the front portions of the sides thereof, each of these rock bars being journaled at its inner end within the partition 6 and being provided at its outer end with any suitable means, such as a crank arm 34, by means of which the bar can be rocked. A stop arm 35 is also preferably extended from the projecting end of each bar 33 and is movable between the stop pins or projections 36 extending from the side of the incubator. A non-rotatable pin 37 is removably mounted within each rock bar 33 at the center of the compartment 5, this pin constituting the pivot of a circular tray 38, as shown in Figs. 4 and 6, made up of a band or rim 39 having parallel cross strips 40 secured thereto, said strips constituting supports for a wire fabric 41 which is secured to the rim 39. Two of these strips 40 are rabbeted as shown at 42 in Fig. 6 so as to constitute guides for a fabric slide 43. A portion of the screen 41 is cut away between these rabbeted strips 40 and the slide 43, when in one of its positions closes the slot thus formed while, by shifting the slide longitudinally it can be removed from under the slot and a clear space formed, this space however being of a width less than the diameter of an egg. A retaining rod 44 extends diametrically within the tray and has its ends seated within the slots 45 formed within the rim 39. Said rods can thus be removed from the tray whenever desired.

An arcuate bail 46 is secured to each band or rim 39 at diametrically opposed points, the middle portion of the bail extending through the fork 31 of the adjoining key 30. This arrangement has been clearly indicated in Fig. 2.

Each pin 37 is preferably provided at its upper end with an angular head 47 which projects above the screen bottom 41 of the tray and is designed to be detachably seated within a central opening 48 formed within a disk 49 which is removably mounted within the tray, said disk being formed with a plurality of egg receiving apertures 50. Under certain conditions these heads 47 may be placed within openings 51 formed in the centers of disks 52 which, except for the central openings 51, are imperforate as shown in Fig. 7.

The space between the bottom of the incubator body and the shelf 13 is designed to receive a drawer 53 for the reception of newly hatched chicks. This drawer is removable through the front opening in the incubator body.

In using the device, the heat generated is distributed through the pipes 8 and 9 and will, obviously, quickly raise the temperature within the compartments 5. Disks 49 are placed within the trays 38 and in engagement with the heads 47 of pins 37 and the eggs are then placed within the openings 50 in the disk and upon the fabric bottoms 41 of the trays. At desired times during the early stages of the process of incubation the trays 38 can be tilted by rocking the bars 33, attention being directed to the fact that the bails 46 are extended at right angles to the axes of the rock bars 33 and will not therefore interfere with this rocking movement of the trays. By thus tilting the trays the yolks of the eggs can be shifted. At a later stage in the process, the disks 49 are removed and disks 52 substituted therefor, the rods 44 being placed in position thereabove, with eggs resting on the disks 52 at opposite sides of the rods. By then tilting the trays in the manner heretofore described the eggs can be caused to roll downwardly within the trays, the cross rods 44 dividing the contents of each tray into two separate groups and thus relieving the lowermost eggs of excessive pressure. Before the substitution of the disks 52 for the disks 49, the eggs in each tray can be tested by shifting the fabric slide 43 from under the slot within the fabric bottom 41 and then turning the tray by means of the key 30. Inasmuch as pin 31 will hold the disk 49 against rotating, it will be seen that when the key is rotated the slot in the bottom of the basket will be brought under the various eggs and by placing a flash-light in the bottom portion of the incubator body, all of the eggs can be conveniently tested by inspection through the sight openings 27.

The drawer 53 can be placed upon the bottom of the incubator body at the proper time so as to receive the chicks as they are hatched, it being understood that the chicks fall into this drawer over the sides of the trays.

Fresh air is admitted to the interior of the incubator at all times by way of the apertured bottoms of the compartments 5. The trays can be removed from the front of the incubator at any time simply by sliding the keys 30 upwardly out of engagement with the bails and then removing the pins 47 whereupon said trays can be drawn forward off of the rock bars 33.

Various changes can of course be made in the construction and arrangement of the parts without departing from the spirit or sacrificing any of the advantages of the invention.

What is claimed is:—

1. An incubator including a body, a rock bar extending thereinto, a tray mounted on and movable with said bar and having an opening, and means for rotating the tray upon the bar, and means for holding eggs in the tray against rotation with the tray.

2. An incubator including a body, a rock bar extending thereinto, means for actuating the bar, a tray detachably mounted upon the bar and tiltable therewith, said tray having an opening means for rotating the tray independently of the bar, and means for holding eggs in the tray against rotation with the tray.

3. An incubator including a body, a tray movably mounted therein, and having a reticulated bottom, there being a slot within said bottom, a closure for the slot, a non-rotatable egg holding device within the tray, and means for rotating the tray to bring the slot at a desired point beneath the holder.

4. An incubator including a body, a tray tiltably mounted therein, said tray having a reticulated bottom, and a holding rod removably mounted upon and extending diametrically across the tray.

5. An incubator including a body, said body having spaced circular compartments therein, a tray tiltably mounted within each compartment and having an opening, separate means for rotating the trays, means for holding eggs in the tray against rotation with the tray and a receptacle removably mounted in the body and extending under both trays.

6. An incubator including a body, a tray tiltably mounted therein, a disk removably mounted within the tray, means for limiting the tilting movement of the tray and holding means disposed diametrically upon and removably mounted on the tray.

7. An incubator including a body having a compartment therein open at the top and bottom, a closure for said bottom and consisting of hingedly connected hollow sections, said sections being constructed for the passage of air there-through, and a closure removably mounted within the body and constituting the top of the compartment.

8. An incubator including a body having a compartment therein open at the bottom and a closure for said bottom consisting of hingedly connected sections insertible into the compartment, said closure being made up of an apertured portion and an upper fabric portion.

9. An incubator including a body having a compartment therein, said compartment being open at the top, a closure insertible into the upper end of the compartment and bearing upon the body, said closure having a sight opening therein, transparent closures for the opening and spaced apart to form an air space there between, a tray mounted for rotation within the compartment and extending under the sight opening, said tray having an opening, and means for holding eggs in the tray against rotation with the tray.

10. An incubator including a body, a rock bar mounted therein, means for actuating the same, means for limiting the movement of the rock bar, a circular tray removably mounted upon the bar said tray having an opening, and means for holding eggs in the tray against rotation with the tray, and tiltable therewith, an arcuate bail upon the tray, and a key loosely engaging the bail and constituting means for rotating the bail and tray upon the bar.

11. An incubator including a body, a top closure therefor, a tiltable tray mounted within the body and having an opening, an arcuate bail upon the tray, a key slidably and revolubly mounted within the closure means upon the key for slidably engaging the bail, said means being adapted to transmit rotary motion from the key to the bail and tray, and means for holding eggs in the tray against rotation with said tray.

In testimony that I claim the foregoing as my own, I have hereto affixed my signature in the presence of two witnesses.

GEORGE W. R. ZIMMERMAN.

Witnesses:
RAYMOND C. PUTMAN,
CHAS. B. T. HENDRICKSON.